(12) United States Patent
Guim Bernat

(10) Patent No.: US 11,669,372 B2
(45) Date of Patent: Jun. 6, 2023

(54) FLEXIBLE ALLOCATION OF COMPUTE RESOURCES

(71) Applicant: Intel Corporation, Santa Clara, CA (US)

(72) Inventor: Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 905 days.

(21) Appl. No.: 16/219,720

(22) Filed: Dec. 13, 2018

(65) Prior Publication Data

US 2019/0121671 A1 Apr. 25, 2019

(51) Int. Cl.
| | |
|---|---|
| G06F 9/50 | (2006.01) |
| H04L 47/80 | (2022.01) |
| H04L 47/70 | (2022.01) |
| G06F 9/30 | (2018.01) |
| H04L 9/40 | (2022.01) |
| H04L 67/60 | (2022.01) |

(52) U.S. Cl.
CPC ............ *G06F 9/505* (2013.01); *G06F 9/3017* (2013.01); *G06F 9/5077* (2013.01); *H04L 47/805* (2013.01); *H04L 47/824* (2013.01); *H04L 63/102* (2013.01); *H04L 67/60* (2022.05); *G06F 2209/501* (2013.01); *G06F 2209/503* (2013.01); *G06F 2209/5011* (2013.01)

(58) Field of Classification Search
CPC ........... G06F 9/3017; G06F 2209/5011; G06F 2209/503; G06F 9/5044; G06F 9/5077; G06F 9/505; G06F 2209/501; H04L 63/102; H04L 67/1029; H04L 47/805; H04L 47/824; H04L 67/32
See application file for complete search history.

(56) References Cited

U.S. PATENT DOCUMENTS

| | | | |
|---|---|---|---|
| 2013/0219068 A1* | 8/2013 | Ballani | G06Q 10/063 709/226 |
| 2018/0027062 A1* | 1/2018 | Bernat | G06F 3/0665 709/224 |

FOREIGN PATENT DOCUMENTS

EP 1643418 B1 * 4/2006 ............... G06F 9/38

OTHER PUBLICATIONS

Standalone Disaggregated Reconfigurable Computing Platforms in Cloud Data Centers Sep. 25, 2017.*

(Continued)

*Primary Examiner* — Frantz B Jean
(74) *Attorney, Agent, or Firm* — Compass IP Law PC

(57) ABSTRACT

A network interface can process a workload request and determine a resource to use to perform the workload request and to generate an executable for execution by the determined resource. A client device or software can determine available resource types. The client device or software can issue a request to perform a workload using a particular resource type. Using telemetry data and performance indicators of available resources, the network interface can select a resource to use to perform the workload. The network interface can translate a workload instruction into a format acceptable by the selected resource and provide the instruction in executable format to the selected resource.

24 Claims, 11 Drawing Sheets

(56) References Cited

OTHER PUBLICATIONS

Schwarzkopf, Malte, et al. "Omega: flexible, scalable schedulers for large compute clusters", Proceedings of the 8th ACM European Conference on Computer Systems, 2013, 14 pages, ACM.
Wilkes, John, "Oct. 2013 Omega: flexible, scalable schedulers for large compute clusters", Nov. 4, 2013, 1 page, https://www.youtube.com/watch?v=XsXlm4wmB6o.

* cited by examiner

FLEXIBLE ALLOCATION OF COMPUTE RESOURCES

TECHNICAL FIELD

Various examples are described herein that relate to scheduling resources to perform a workload.

BACKGROUND

Data centers provide vast processing, storage, and networking resources to users. For example, client devices can leverage data centers to perform image processing, artificial intelligence-based inference models, computation, data storage, and data retrieval. A client device such as a smart phone, Internet-of-Things (IoT) compatible device, a smart home, building appliance (e.g., refrigerator, light, camera, or lock), wearable device (e.g., health monitor, smart watch, or smart glasses), connected vehicle (e.g., self-driving car or flying vehicle), and smart city sensor (e.g., traffic sensor, parking sensor, or energy use sensor). Client devices access resources of a data center using a high-speed wired or wireless networking connection. It is generally desirable to reduce the time taken by the data center to complete a task and return a response.

DETAILED DESCRIPTION

Figure 1:
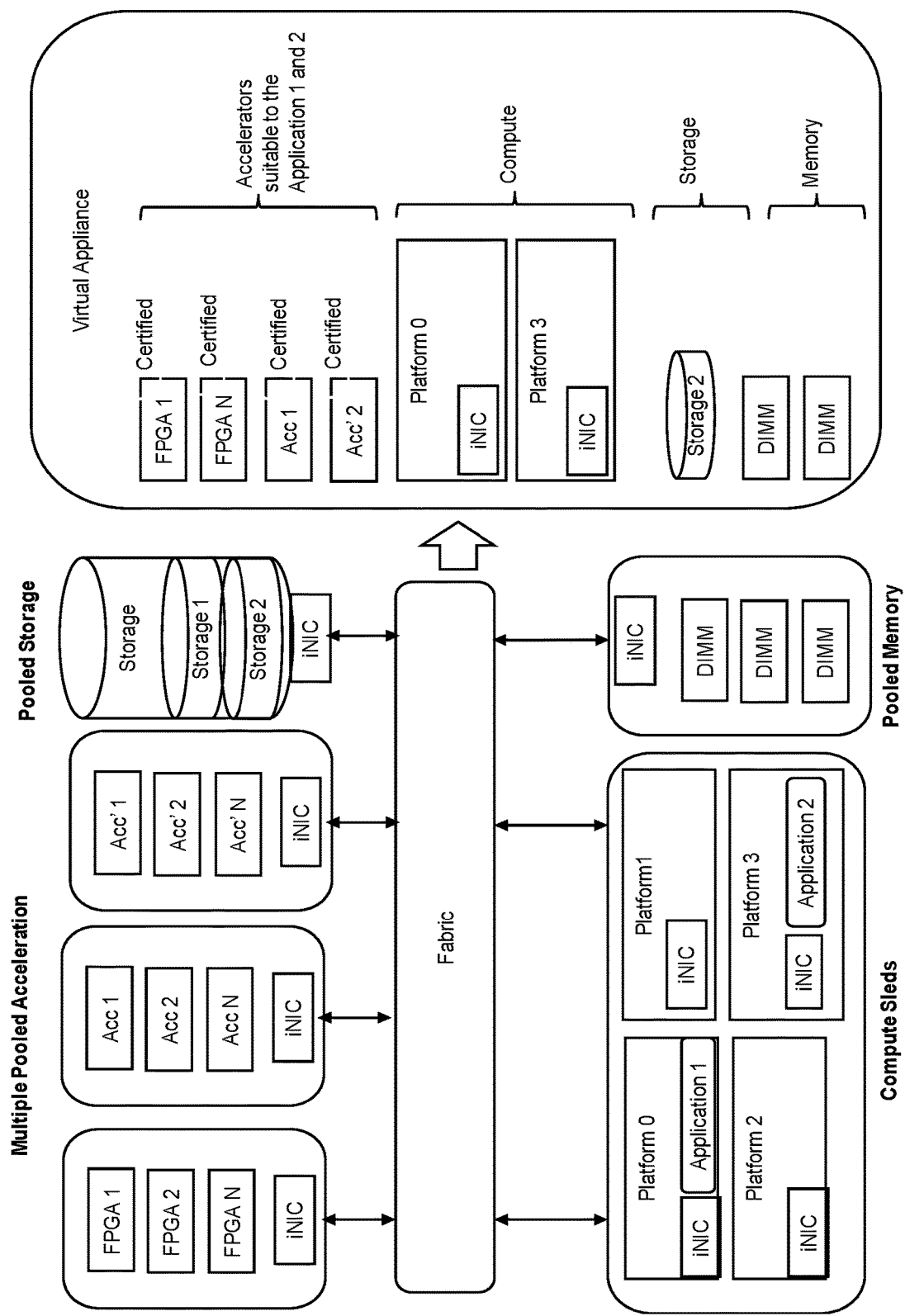
FIG. 1 depicts an example platform with acceleration devices available for use by software applications.

FIG. 1 depicts an example platform with acceleration devices available for use by software applications. Resources can include field programmable gate arrays (FPGAs) (e.g., FPGAs 1-N), central processing units (e.g., Platforms 0-3), memory devices (e.g., dual in-line memory modules (DIMMs)), storage devices (e.g., Storage 1-2), or acceleration resources (e.g., Acc 1-N and Acc' 1-N). Resources and compute sleds with platforms 0-3 are coupled together using a fabric. Various acceleration resources and the compute sleds can be connected to the fabric using intelligent network interfaces (iNICs). In this example, the compute sleds execute application 1 and application 2. The platform can be abstracted to be a virtual appliance whereby various compute and acceleration resources are available for use by applications 1 and 2 and otherwise available for use to other software and clients. For example, FPGAs 1 and N and accelerators Acc 1 and Acc' 2 can be certified as acceptable for use by Applications 1 and 2. In addition, platforms 0 and 3, Storage 2 and various DIMMs are available for use.

In edge cloud architectures where the response time for many inference requests received from clients (e.g., IoT devices, self-driving vehicles, and so forth) is desired to be low latency (e.g., on the order of a few milliseconds) or where the system is to automatically scale to absorb different loads, a data center overprovisions the CPU cycles to ensure that these scheduling decisions can indeed be made quickly. In addition, when a workload or service, such as an inference model, can be accelerated by multiple different type of acceleration technologies (e.g., FPGA, GPU, or AI interference acceleration engine), the client or client software stack has to select the accelerator to use and prepare the workload or service to run on the selected accelerator, thereby introducing additional delay to completing a workload or service.

An important challenge in the use of acceleration is scaling the available numbers of resources with low overhead cost and low latency. Currently, software-based scheduling is used to schedule acceleration resources in a platform in the face of increasing demand for acceleration engines from increased acceleration requests. A software-based scheduler can be software executing on a central processing unit (CPU) that decides what device is to process the acceleration request and how the acceleration request is to be processed. First, the approach can add scheduling latency on top of the request processing latency. Second, the approach uses dedicated CPUs for such scheduling and associated resource management and prioritization. Third, the approach can lead to increased total cost of ownership (TCO) from the purchase and use of CPUs to perform the scheduling decisions.

As platform accelerators increase in number or in physical size and requests for acceleration increases, the scalability of software-based scheduling becomes a significant design challenge. A current popular scheduling method is hierarchical scheduling whereby a system has several schedulers and a top level scheduler (e.g., hierarchical scheduling in the Omega scheduler described in Schwarzkopf, Malte, et al. "Omega: flexible, scalable schedulers for large compute clusters," Proceedings of the 8th ACM European Conference on Computer Systems, ACM, 2013). Hierarchical scheduling provides scalability but at the expense of resources dedicated for scheduling purposes, which can increase the total cost of ownership of an acceleration platform, edge node, or data center.

To meet low latency "real-time" demands of many workloads, an alternative that other systems employ commonly is to statically partition the resource pool and limit how much work each scheduler needs to do over its assigned partition so that as jobs enter the arrival queue, they can be assigned the needed resources in the background and quickly. However, this scheduling scheme can increase the total cost of ownership as it provides dedicated, potentially, underutilized resources.

Various embodiments provide an acceleration logic inside a network interface or interconnect interface. The network interface or interconnect interface can communicate with other devices (e.g., compute resources) using a communications fabric or other network medium. A client device (e.g., compute platform, data center, edge node, virtual machine, application, or software) can discover the types of compute or acceleration resources available at one or more compute sleds or platform of devices or resources. The client device can request performance of a workload using a resource and provide a workload request that includes one or more of: the instructions that are to be performed by the accelerator, acceleration type, service level agreement (SLA) definitions, model type, performance requirements, or the workload definition. The acceleration logic can select a compute resource or accelerator using telemetry data from compute platforms and accelerators to determine which compute resource or accelerator to select to perform the workload request/service. Regardless of the format of the workload request from the client, the acceleration logic can generate a bitstream or compiled kernel code format suitable for execution on the selected compute resource or accelerator, and the acceleration logic can submit the request in the form of a bitstream or compiled kernel code format to the selected accelerator for execution.

From a client perspective, there could be multiple different acceleration units available for use. For example, five different image recognition hardware accelerators or software-based image recognition models could be available and image detection workloads could be offloaded to an FPGA device, GPU, CPU, and so forth. A client can submit source code or a binary for execution on an accelerator. For example, the client could submit an FPGA-accepted bitstream that defines transistors or logic that will be instantiated/activated, OpenCL instructions, or native instructions for a particular accelerator. Various embodiments provide for translation and transformation of any instructions written to run on one acceleration device to a format that can run on another acceleration device. For example, if an application submits an FPGA-accepted bitstream but a load balancer determines that another accelerator (e.g., a GPU) is to be used, the bitstream can be translated into a format that can be performed by the other accelerator. Any type of hardware device such as an FPGA or ASIC can perform binary translation.

In some examples, if an application submits a source code format of instructions to perform in a workload that can be executed on a first accelerator (after compiling), but a load balancer selects a second accelerator to perform the workload associated with the source code, then the source code can be translated to a binary format suitable for execution on the second accelerator.

Figure 2:
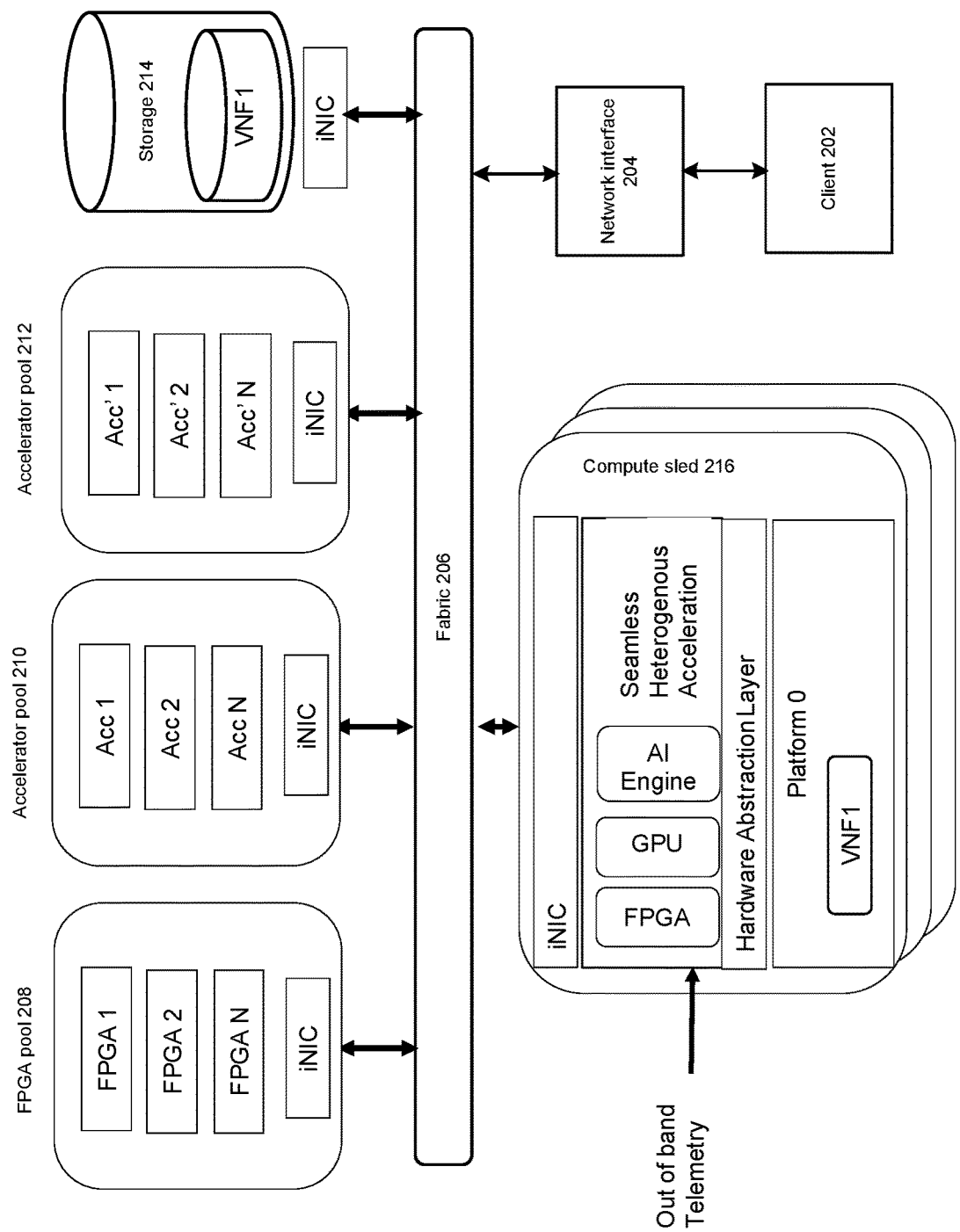
FIG. 2 provides a high level diagram of an embodiment.

FIG. 2 provides a high level diagram of an embodiment. In this embodiment, a variety of compute sleds 216 can be provided whereby each sled is connected to a fabric 206 via a network interface or other type of interconnect. For example, pool 208 of field programmable gate arrays (FPGAs) can be provided in a compute sled and are accessible via network interface or interconnect. Pool 210 of accelerators can be provided in another compute sled and accessible via network interface or interconnect. Pool 212 of accelerators can be provided in a compute sled and accessible via network interface or interconnect. Storage 214 can be provided in a compute sled and accessible via network interface or interconnect.

A network interface (e.g., iNIC) of pool 208, 210, 212, storage 214, or sleds 216 can expose the type of acceleration available, instead of specific acceleration technologies available, as well as the abstract programming language supported by the acceleration. For example, a type of acceleration available can be generic acceleration, AI inference, image processing, search, lookup, storage, and so forth. An abstract programming language can be OpenCL, VHSIC Hardware Description Language, Python, and so forth. A specific type of acceleration technology can be an actual type of hardware (e.g., FPGA, accelerator, CPU, GPU, or GPGPU) and a specific accelerator model that it executes (e.g., artificial intelligence (AI) inference model, neural network, image recognition, and so forth).

When client 202 requests acceleration of a particular execution of a model for a particular technology and abstract programming language, the client provides to network interface 204 a particular model with a given payload. Network interface 204 selects an acceleration resource (e.g., pool 208, pool 210, pool 212, storage 214, or sled 216) based on telemetry data and using load balancing of the available resources. For example, telemetry data can include boundedness (e.g., utilization of one or more of: processor, memory, network, storage, or cache), applied resource allocations, total cost of ownership, or performance characteristic(s). Network interface 204 generates a corresponding bitstream for execution by the selected acceleration resource and registers the bitstream and causes its execution on the selected acceleration resource on behalf of the client. The acceleration resource provides results for transfer to the client using fabric 206. Network interface 204 can be implemented as a wireless base station (e.g., 3G, 4G, 5G, 6G, and so forth), access point (e.g., IEEE 802.11, or wired network connection (e.g., Ethernet, InfiniBand).

In some embodiments, resource scheduling is disaggregated from a software stack that also executes an operating system, virtual machine manager (VMM), and so forth. In some embodiments, resource scheduling can be performed on a central processing unit allocated solely for accelerator selection and assignment for example in network interface 204.

Figure 3:
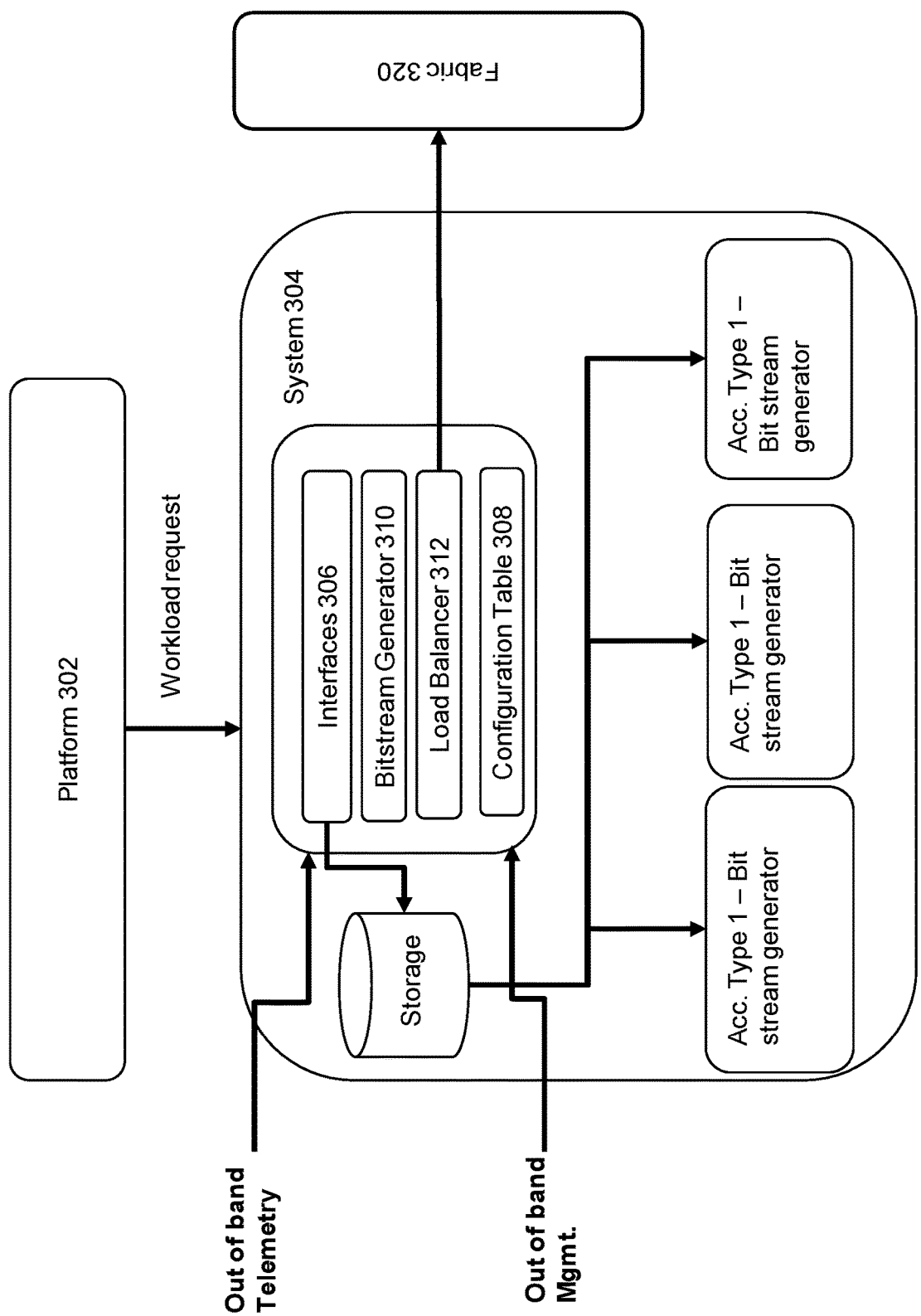
FIG. 3 provides a block diagram of a system that can be used to select a compute resource to perform a workload.

FIG. 3 provides a block diagram of a system that can be used to select a compute resource to perform a workload. Platform 302 (e.g., a client device, application, software, virtual machine, data center, or any computing cluster) can request performance of a workload by system 304. The workload request can be an instruction format of Accelerate (ModelSource, AccType, SLA, ModelType, Perf Requirements), where ModelSource represents source code instructions, AccType represents a type of accelerator to use, SLA represents service level agreement (e.g., time to complete workload request, time to provide result after receipt of workload request), ModelType represents a language of the source code instructions, and Perf Requirements represents a speed of operation (e.g., operations per second). In some examples, the workload request can be an instruction format of Accelerate({complied bit-streams}, AccType, SLA, ModelType, Perf Requirements) is similar to the prior instruction format except it provides a compiled bitstream kernel instead of a source code representation.

Interfaces 306 can be provided to the platform for the platform to discover and use the different acceleration capabilities. Interfaces 306 can allow platform 302 to discover the different acceleration types and the supported abstraction programming languages of system 304 and resources connected to system 304 using fabric 320. Interfaces 306 can also allow platform 302 to provide a request to execute a workload in any accelerator that is of a particular type with a given required performance and with a particular deadline. In some examples, the platform could provide a pre-compiled bitstream and specify a workload with a given required performance and with a particular deadline.

Configuration table 308 can store information that specifies the type of accelerators that are available for use. For example, Table 1 below provides an example of a configuration table.

TABLE 1

| Accelerator ID | Accelerator Type | Performance characteristics | Bitstream generator | Supported models |
|---|---|---|---|---|
| 0x333 | AI | 20 TOPs | Path to storage | OpenCL |
| ... | ... | ... | ... | ... |

Out-of-band or in-band management of configuration table 308 can be provided whereby contents of configuration table 308 are updated by an external device or system.

Accelerator ID can specify an identifier of an accelerator type, Accelerator Type can specify a type of accelerator, Performance characteristics can specify performance that can be achieved by the type of accelerator specified by the ID (e.g., tera-flops per second or tera-operations per second), Bitstream generator can specify a bitstream generator to use to generate a bitstream for the accelerator ID, and Supported models can specify a programming language accepted by the accelerator ID. A variety of accelerator IDs can be provided that are of the same type but with different IDs, and different or the same performance characteristics, bitstream generators, and supported models.

Bitstream generator 310 can execute a bitstream model generator for a particular source code to generate the bitstream to be executed in a given accelerator resource. Bitstream generator 310 can be executed in a local compute of the network interface (e.g., CPU, FPGA, or any other type of compute) to generate a bitstream from a programming language. Note that a given acceleration resource can have multiple bitstream generators. For example, if a workload request is provided with a source type that is suitable for an accelerator but the selected accelerator is a different device, the bitstream generator can translate the source type to a format for execution on the selected accelerator.

Load balancer 312 can process the workload requests. Using configuration table 308, load balancer 312 selects the accelerators that satisfy the parameters of the workload request instruction (e.g., acceleration type, SLA requirements, and required performance (e.g., tera-operations or tera-flops per second)). Using the telemetry out-of-band data coming from different accelerators of the acceleration type (e.g., load, estimated time to availability, remaining accelerator space, available memory, boundedness, utilization, and so forth), load balancer 312 selects suitable accelerators. Based on the required performance requirements from an SLA for a workload, bitstream generation time, and available performance indicators of the accelerators, load balancer 312 selects the accelerator that will be used to execute the model. If there are multiple accelerators that meet the requirements, load balancer 312 can use a round robin scheme to select an accelerator that meets the performance requirements. Load balancer 312 selects bitstream generator 310 to generate a bitstream that the selected accelerator can execute to perform the workload. Load balancer 312 can register the bitstream for execution on the remote accelerator. In some cases, if an accelerator is not available to meet the requirements of the workload, load balancer 312 can choose an accelerator that provides performance nearest to the performance requirements of the workload.

In some embodiments, system 304 can be implemented in a network interface (NIC). In some embodiments, the system can be implemented in a host platform where the compute platform includes a central processing unit, a memory, a storage, and an interconnect. The network interface can access accelerator devices using a fabric 320 (e.g., a crossbar, switch fabric, network or interconnect). Fabric 320 can connect the network interface with the selected resource so that the network interface can register the bitstream for execution. In some examples, fabric 320 be any combination of one or more of a PCIe interface, Ethernet network, InfiniBand network, or optical-based interconnect. The resources can include FPGAs, GPUs, AI inference engines, memory, storage, CPUs, and so forth.

For example, an accelerator can use a neural network, processors, and memory. Processors can include a single or multi-core processor, graphics processing unit, logical execution unit single or multi-level cache, functional units usable to independently execute programs or threads, application specific integrated circuits (ASICs), neural network processors (NNPs), programmable control logic, and programmable processing elements such as field programmable gate arrays (FPGAs). A neural network can be embodied as a separate neural network device use any components of processors. Multiple neural networks, processor cores, or graphics processing units can be made available for use by AI or ML models. For example, the AI model can use or include any or a combination of: a reinforcement learning scheme, Q-learning scheme, deep-Q learning, or Asynchronous Advantage Actor-Critic (A3C), combinatorial neural network, recurrent combinatorial neural network, or other AI or ML model. Multiple neural networks, processor cores, or graphics processing units can be made available for use by AI or ML models.

Figure 4A:
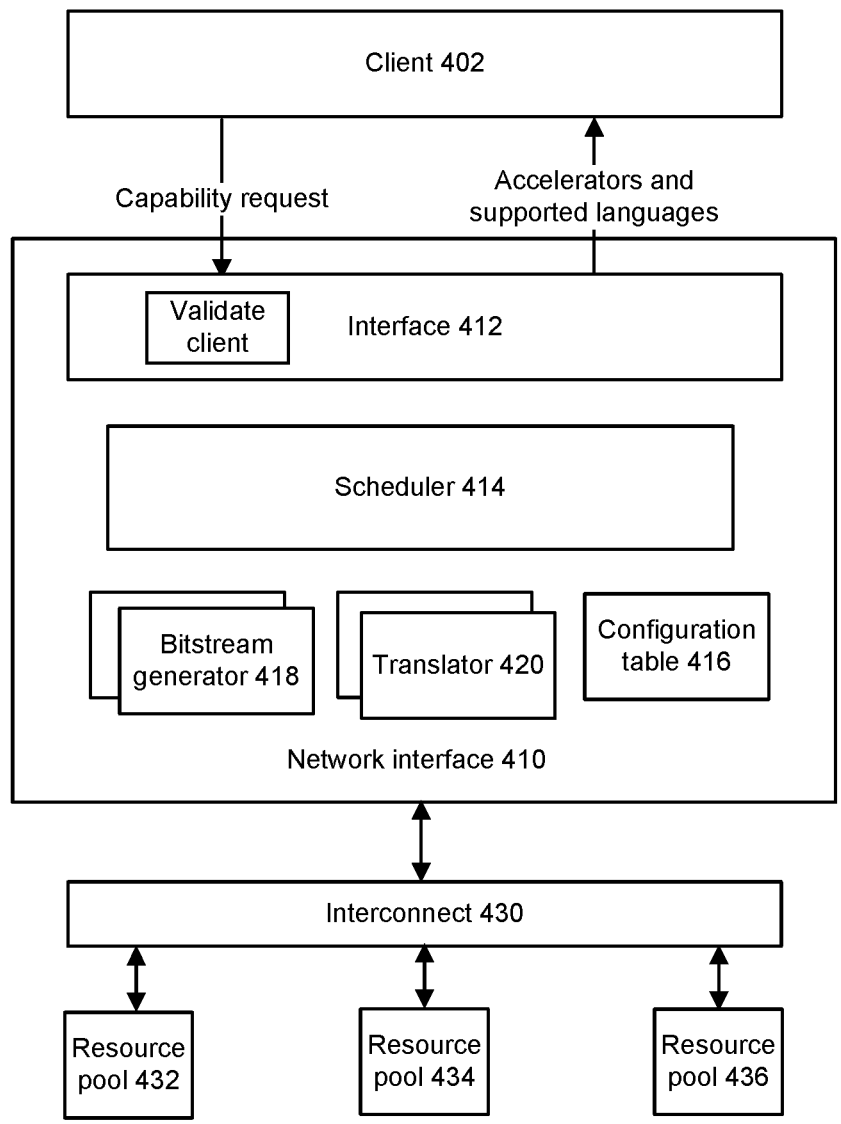
FIGS. 4A-4E depict an example by which a system determines which device is to perform a request and provides instructions to the device to perform the request.

FIGS. 4A-4E depict an example by which a system determines which device is to perform a request and provides instructions to the device to perform the request. In FIG. 4A, a client can request available capabilities to execute a workload. Client 402 can be any type of computing device such as a mobile phone, IoT device, self-driving vehicle, smart home appliance, laptop computer, data center, edge computing node, and so forth. Client 402 can be any type of software such as an application, virtual machine, operating system, and so forth. Client 402 can interface with network interface 410 using interface 412. Interface 412 can validate that client 402 is permitted to request use of any of the resources managed by scheduler 414. For example, an identifier of client 402 can include an IP address, MAC address, client application that requests use of a resource, a user identifier, and so forth. If the client 402 has an accepted identifier, interface 412 can identify accelerators and supported programming languages of the accelerators to client 402. Generic types of accelerators can be identified to client 402. In this example, scheduler 414 can schedule execution of workloads on any of resource pools 432-436. For example, configuration table 416 can identify that resource pool 432-436 provide types of resources as opposed to identifying the specific compute resource devices that are available to client 402. A type of resource can be for example image recognition, AI inference engines, and storage. A specific compute resource device can be a particular type of hardware (e.g., FPGA, CPU, GPU, GPGPU, or ASIC) and the specific accelerator model that it executes (e.g., artificial intelligence (AI) inference model, neural network, image recognition, and so forth).

Figure 4B:
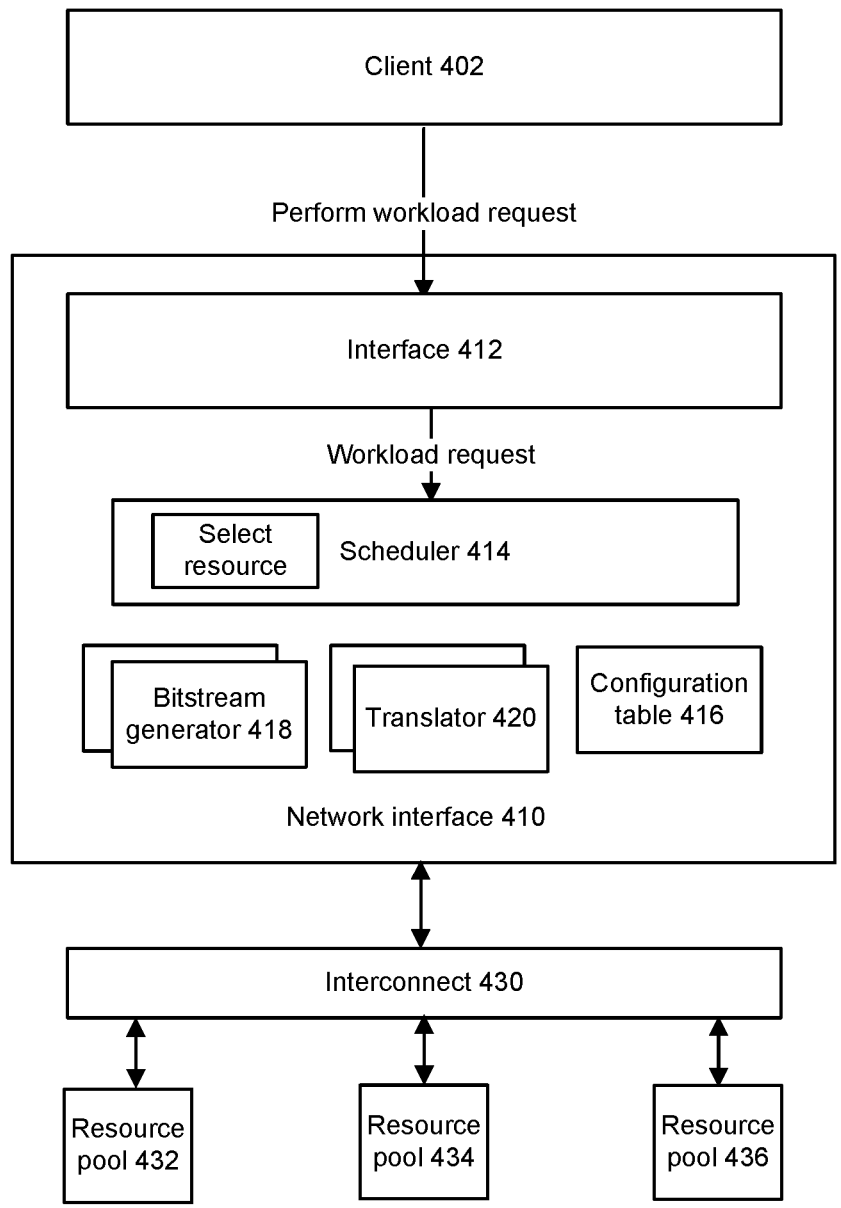

In FIG. 4B, client 402 can provide a request to perform a workload. Client 402 can transmit the workload request to interface 412 using an application program interface (API) that specifies a workload request source code or compiled bitstream, acceleration type, service level agreement requirements (e.g., time from start of workload to providing a result), model type, and performance requirements. Interface 412 can receive the request and provide it to scheduler 414. Scheduler 414 can determine which accelerator to choose to execute the workload request.

Scheduler 414 can consider out-of-band or in-band communications from resource pools 432-436. Out-of-band data transfer links can provide out of band transfer of telemetry data and workload performance measurements to scheduler 414 independent from use of a networking or other connection between network interface 410 and any resource pool 432-436. In-band communications can use interconnect 430. For example, telemetry data can include boundedness (e.g., utilization of one or more of: processor, memory, network, storage, or cache), applied resource allocations, total cost of ownership, or performance characteristic(s). Scheduler 414 can select the resource to perform the workload request based on the data and configuration table 416.

For example, configuration table 416 can identify functionality of resources among resource pools 432-436 and performance characteristics of the functionality. The information in configuration table 416 can be used to select one or more resources that can meet the requirements of the workload request.

Figure 4C:
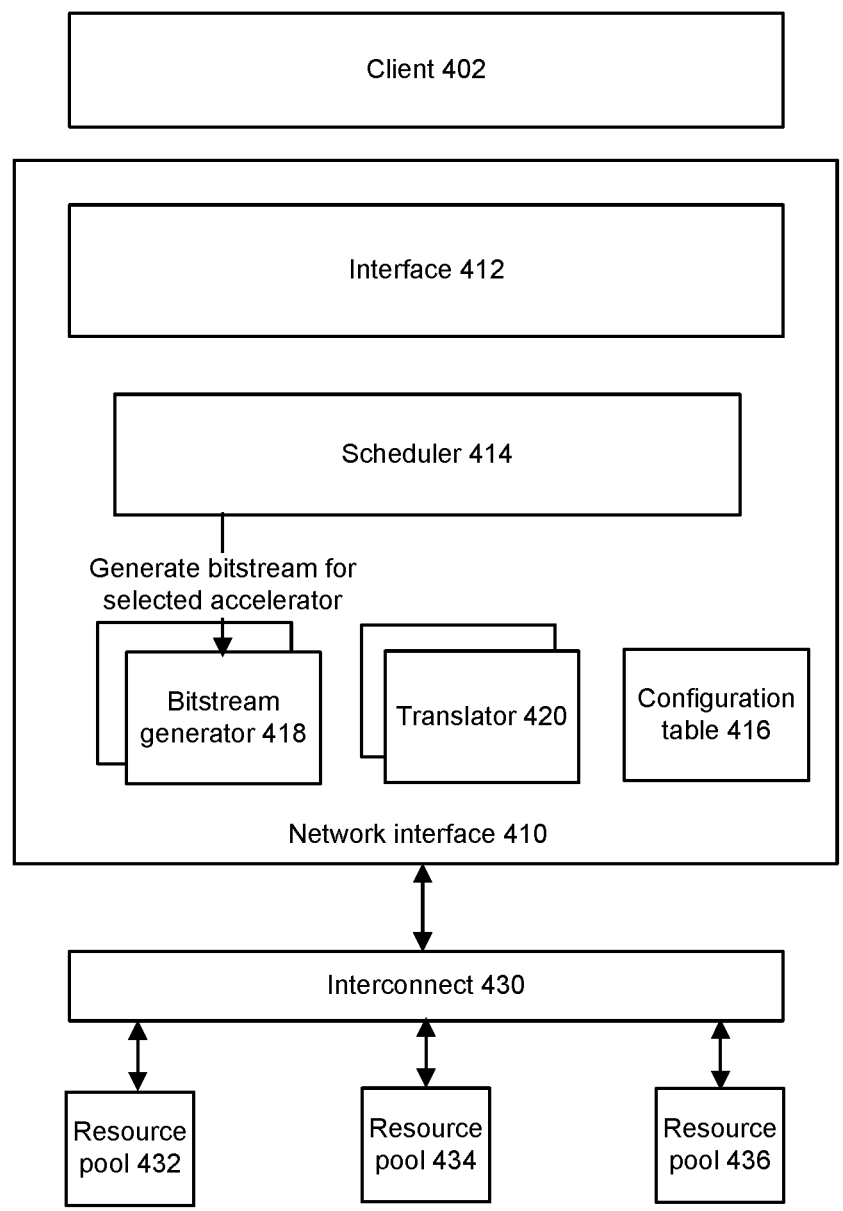

In FIG. 4C, scheduler 414 provides the workload to bitstream generator 418 to generate a bitstream compatible with the selected accelerator. Multiple instances of a bitstream generator 418 can be available where each bitstream generator can generate a bitstream for a single or multiple accelerators. Availability of multiple bitstream generators can provide for reducing latency between selection of an accelerator. A bitstream generator can be selected for use based on a variety of criteria such as availability, round robin, and other selection schemes. Bitstream generator 418 can be implemented using an FPGA, processor, central processing unit, graphics processing unit, or other hardware devices. Bitstream generator 418 can receive a source code version of the workload request or a bitstream version of the workload request. If the selected accelerator accepts the source code format, then bitstream generator 418 can compile the source code and provide a bitstream output. If the selected accelerator accepts the bitstream format from the client, the bitstream from the client can be provided to the selected accelerator without translation or use of bitstream generator 418. If the selected accelerator does not accept the source code or bitstream from the client, then bitstream generator 418 can generate a bitstream format from the source code to generate a bitstream that can execute on the selected accelerator. For example, a translator 420 can be used to translate the source code into a format that can be executed by the selected resource.

Multiple instances of translator 420 are available for use. Translator 420 can use a compiler, interpreter or translator to translate the source code into another language acceptable by the selected accelerator. Bitstream generator 418 can generate a bitstream kernel executable by the selected accelerator from the translated source code.

Figure 4D:
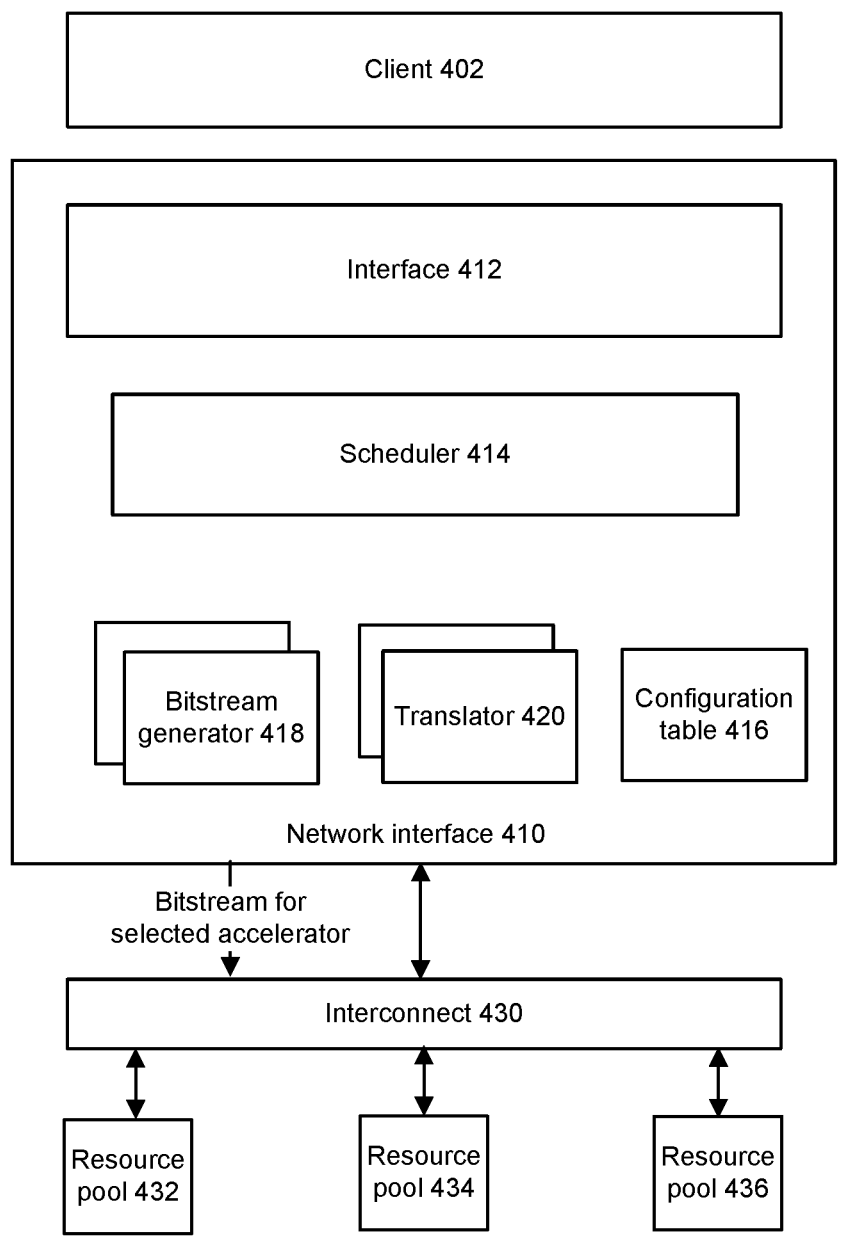

In FIG. 4D, network interface 410 provides the bitstream to the selected accelerator. For example, an interconnect 430 can be used to transfer the bitstream to the selected accelerator among resource pool 432-436. Interconnect 430 can comply with any standards such as PCIe, an optical interface standard, Ethernet, InfiniBand, High-Speed Serial Interface (HSSI), and so forth (and any combination thereof). Any of resource pool 432-436 can be implemented as compute sleds that are communicatively coupled with interconnect 430.

Figure 4E:
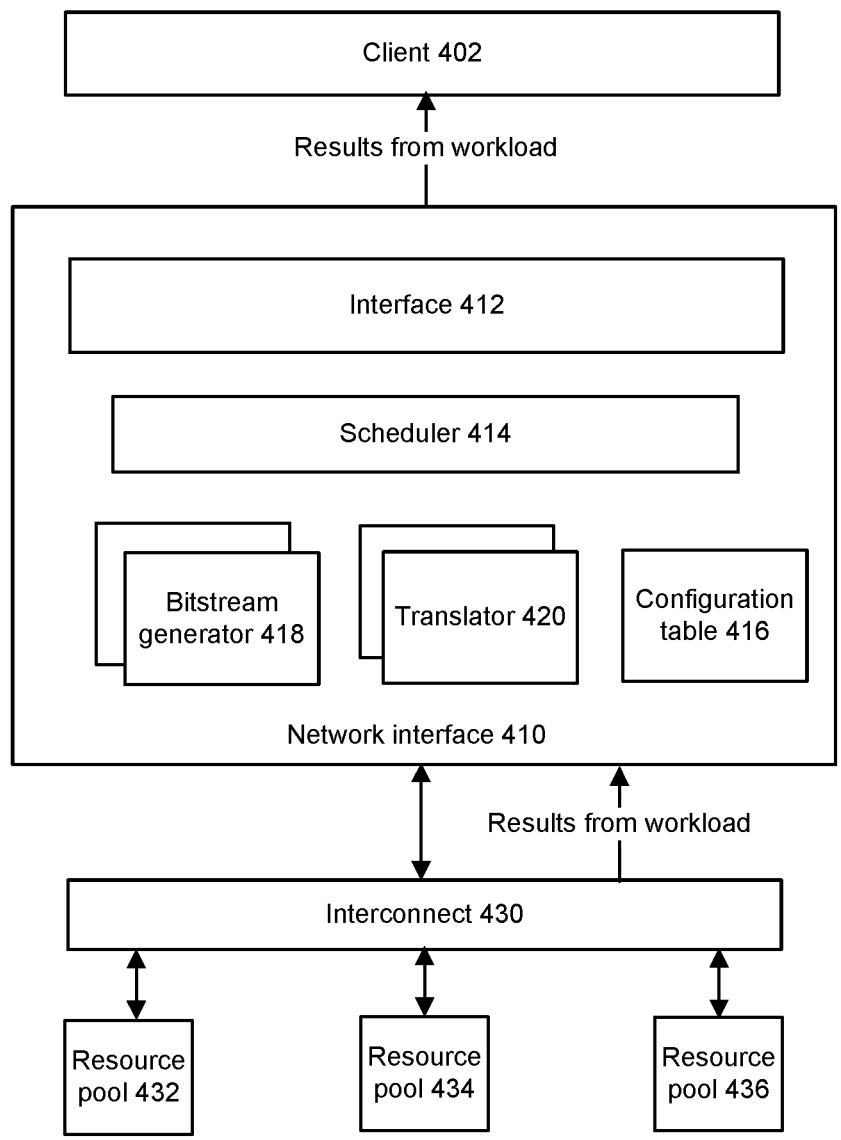

In FIG. 4E, a selected resource can provide a result after execution of the bitstream. The result or a reference to the result in storage can be provided through interconnect 430 for transmission by network interface 410 to client 402.

In some embodiments, client 402 can issue a request for use of a specific compute resource device with an instruction and workload performance parameters. Network interface 410 can select a resource to use using techniques described herein. If the selected resource is different than the requested resource or does not accept the format of instruction provided, network interface 410 can translate the instruction into a form that is executable by the selected resource.

Figure 5:
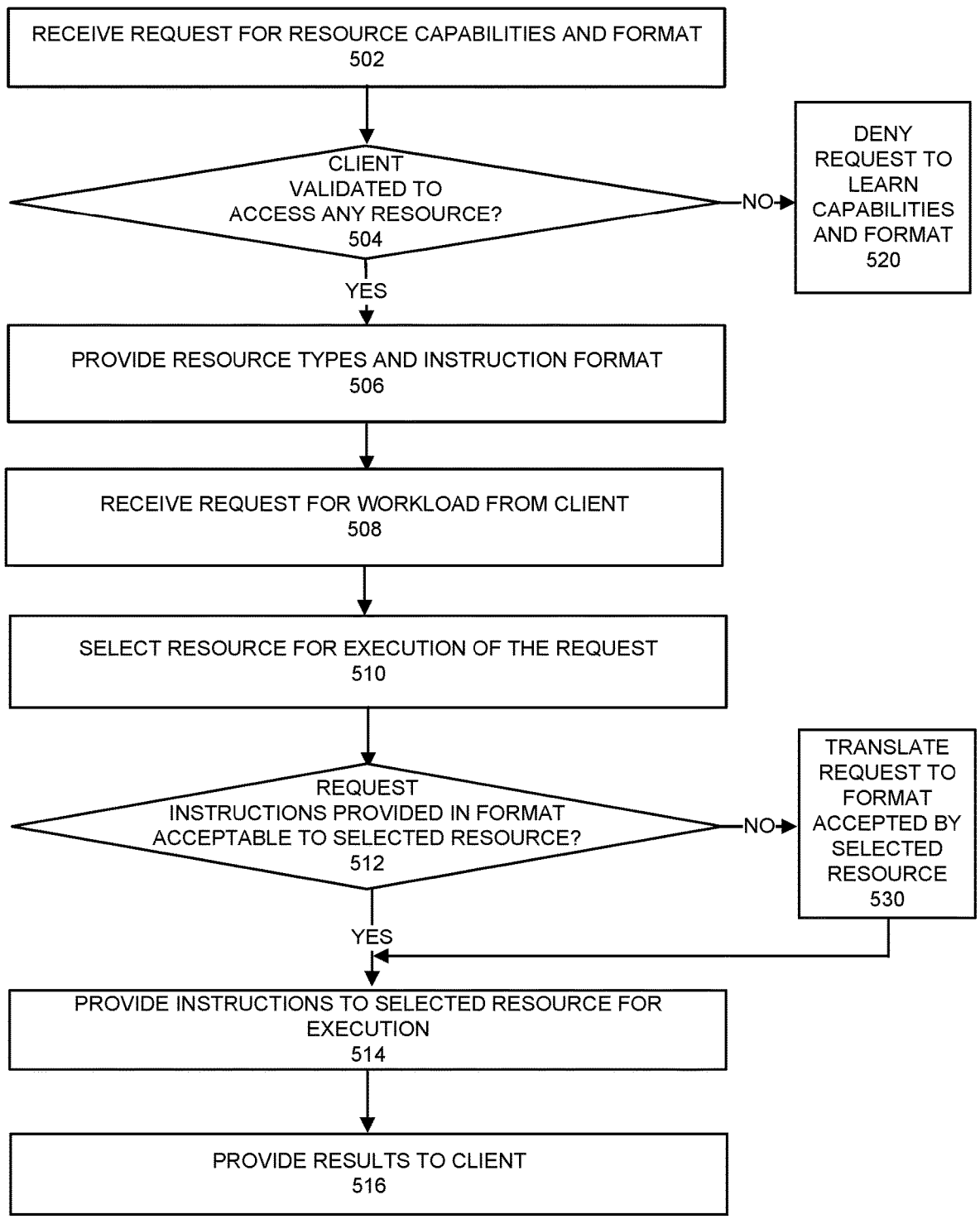
FIG. 5 depicts an example process.

FIG. 5 depicts an example process. The process can be performed by a network interface or interface to an interconnect or fabric, for example. At 502, a request is received from a client device to determine available compute resources and supported programming languages. The client device can include any type of computing device such as a mobile phone, IoT device, self-driving vehicle, smart home appliance, laptop computer, data center, edge computing node, and so forth. The client device can include any type of software such as an application, virtual machine, operating system, and so forth. At 504, a determination is made as to whether the client device is permitted to request use of any computing resource. If the client device is permitted to use any computing resource, then 506 follows. If the client device is not permitted to use any computing resource, then 520 follows where the client's request to learn resource capabilities and instruction formats is denied.

At 506, computing resource types and instruction formats are provided to the client device. For example, a network interface can use a look-up table that stores available compute resource types and instruction formats accepted by the compute resources. Compute resources types can be categories of functions provided by compute resources as opposed to names of the specific compute resources that perform the functions. For example, resource types can include: AI interference acceleration, image recognition, storage, computation, data retrieval, and so forth.

At 508, a workload request can be received from a client. The workload request can specify one or more of: workload request source code or compiled bitstream, acceleration type, service level agreement requirements, model type, and performance requirements. At 510, a selection is made of a resource to perform the workload request. The resource can be selected based on the resources that are of the specified resource type and that can provide performance that complies with client specified performance requirements. Telemetry data can be considered to decide which resource to select for use. For example, telemetry data can indicate load, estimated time to availability, remaining accelerator space, available memory, boundedness, utilization, and so forth of each accelerator resource.

At 512, a determination is made as to whether the instructions provided with the workload request are in a format accepted by the selected resource. If the source code is of a format that is accepted by the selected resource, the source code can be compiled and provided for execution by the selected resource in 514. If the bitstream provided with the workload is of a format that is accepted by the selected resource, the bitstream is provided to the selected resource for execution in 514. However, if the source code or the bitstream is not of a format that is accepted by the selected accelerator, then at 530, the source code or bitstream is translated into a format that is accepted by the selected resource. For example, the source code or bitstream can be transcoded into a format that, when compiled, is executable by the selected resource and the compiled code is provided to the selected resource at 514.

At 516, the selected resource executes the compiled code and provides results to the client. For example, results can be data, image, a file, or a reference to data, image, or file stored in memory via a link or pointer.

Figure 6:
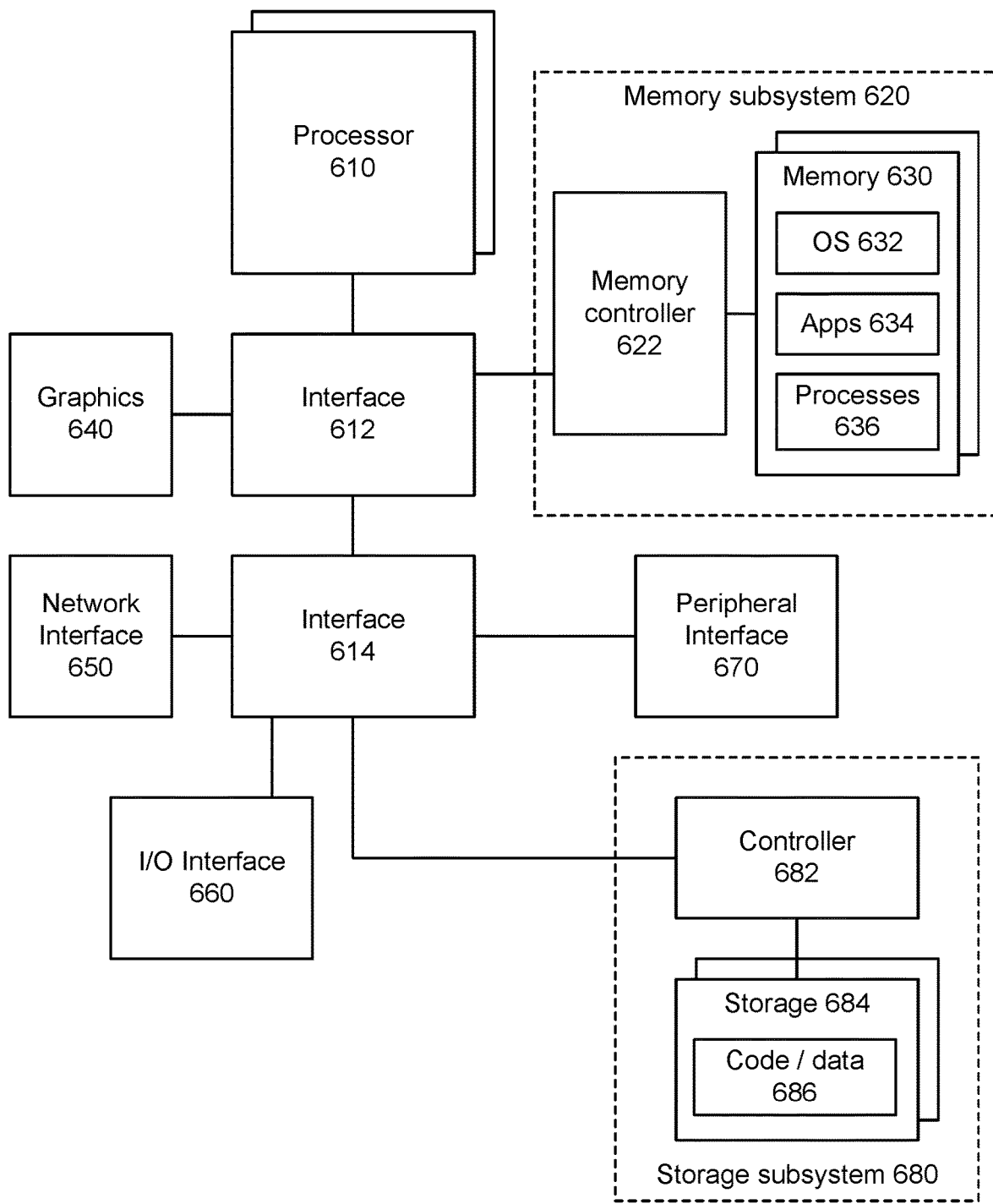
FIG. 6 depicts an example of a computing system.

FIG. 6 depicts an example of a computing system. System 600 represents a computing device in accordance with any example herein, and can be a laptop computer, a desktop computer, a tablet computer, a server, group of servers, a gaming or entertainment control system, routing or switching device, embedded computing device, a smartphone, a wearable device, an internet-of-things device or other electronic device.

System 600 includes processor 610, which provides processing, operation management, and execution of instructions for system 600. Processor 610 can include any type of microprocessor, central processing unit (CPU), graphics processing unit (GPU), processing core, or other processing hardware to provide processing for system 600, or a combination of processors. Processor 610 controls the overall operation of system 600, and can be or include, one or more programmable general-purpose or special-purpose microprocessors, digital signal processors (DSPs), programmable controllers, application specific integrated circuits (ASICs), programmable logic devices (PLDs), or the like, or a combination of such devices.

In one example, system 600 includes interface 612 coupled to processor 610, which can represent a higher speed interface or a high throughput interface for system components that needs higher bandwidth connections, such as memory subsystem 620 or graphics interface components 640. Interface 612 represents an interface circuit, which can be a standalone component or integrated onto a processor die. Where present, graphics interface 640 interfaces to graphics components for providing a visual display to a user of system 600. In one example, graphics interface 640 can drive a high definition (HD) display that provides an output to a user. High definition can refer to a display having a pixel density of approximately 100 PPI (pixels per inch) or greater and can include formats such as full HD (e.g., 1080p), retina displays, 4K (ultra-high definition or UHD), or others. In one example, the display can include a touchscreen display. In one example, graphics interface 640 generates a display based on data stored in memory 630 or based on operations executed by processor 610 or both. In one example, graphics interface 640 generates a display based on data stored in memory 630 or based on operations executed by processor 610 or both.

Memory subsystem 620 represents the main memory of system 600 and provides storage for code to be executed by processor 610, or data values to be used in executing a routine. Memory subsystem 620 can include one or more memory devices 630 such as read-only memory (ROM), flash memory, one or more varieties of random access memory (RAM) such as DRAM, or other memory devices, or a combination of such devices. Memory 630 stores and hosts, among other things, operating system (OS) 632 to provide a software platform for execution of instructions in system 600. Additionally, applications 634 can execute on the software platform of OS 632 from memory 630. Applications 634 represent programs that have their own operational logic to perform execution of one or more functions. Processes 636 represent agents or routines that provide auxiliary functions to OS 632 or one or more applications 634 or a combination. OS 632, applications 634, and processes 636 provide software logic to provide functions for system 600. In one example, memory subsystem 620 includes memory controller 622, which is a memory controller to generate and issue commands to memory 630. It will be understood that memory controller 622 could be a physical part of processor 610 or a physical part of interface 612. For example, memory controller 622 can be an integrated memory controller, integrated onto a circuit with processor 610.

While not specifically illustrated, it will be understood that system 600 can include one or more buses or bus systems between devices, such as a memory bus, a graphics bus, interface buses, or others. Buses or other signal lines can communicatively or electrically couple components together, or both communicatively and electrically couple the components. Buses can include physical communication lines, point-to-point connections, bridges, adapters, controllers, or other circuitry or a combination. Buses can include, for example, one or more of a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 664 bus.

In one example, system 600 includes interface 614, which can be coupled to interface 612. In one example, interface 614 represents an interface circuit, which can include standalone components and integrated circuitry. In one example, multiple user interface components or peripheral components, or both, couple to interface 614. Network interface 650 provides system 600 the ability to communicate with remote devices (e.g., servers or other computing devices) over one or more networks. Network interface 650 can include an Ethernet adapter, wireless interconnection components, cellular network interconnection components, USB (universal serial bus), or other wired or wireless standards-based or proprietary interfaces. Network interface 650 can transmit data to a remote device, which can include sending data stored in memory. Network interface 650 can receive data from a remote device, which can include storing received data into memory.

In one example, system 600 includes one or more input/output (I/O) interface(s) 660. I/O interface 660 can include one or more interface components through which a user interacts with system 600 (e.g., audio, alphanumeric, tactile/touch, or other interfacing). Peripheral interface 670 can include any hardware interface not specifically mentioned above. Peripherals refer generally to devices that connect dependently to system 600. A dependent connection is one where system 600 provides the software platform or hardware platform or both on which operation executes, and with which a user interacts.

In one example, system 600 includes storage subsystem 680 to store data in a nonvolatile manner. In one example, in certain system implementations, at least certain components of storage 680 can overlap with components of memory subsystem 620. Storage subsystem 680 includes storage device(s) 684, which can be or include any conventional medium for storing large amounts of data in a nonvolatile manner, such as one or more magnetic, solid state, or optical based disks, or a combination. Storage 684 holds code or instructions and data 686 in a persistent state (i.e., the value is retained despite interruption of power to system 600). Storage 684 can be generically considered to be a "memory," although memory 630 is typically the executing or operating memory to provide instructions to processor 610. Whereas storage 684 is nonvolatile, memory 630 can include volatile memory (i.e., the value or state of the data is indeterminate if power is interrupted to system 600). In one example, storage subsystem 680 includes controller 682 to interface with storage 684. In one example controller 682 is a physical part of interface 614 or processor 610 or can include circuits or logic in both processor 610 and interface 614.

A power source (not depicted) provides power to the components of system 600. More specifically, power source typically interfaces to one or multiple power supplies in system 600 to provide power to the components of system 600. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

Examples described herein can be applied to wired or wireless communication transmitters or transceivers. Examples can be used by or in connection with radio frequency (RF) transceiver components for accessing wireless voice and/or data networks (e.g., using cellular telephone technology, data network technology such as 3G, 4G/LTE, 5G, Wi Fi, other IEEE 802.11 family standards, or other mobile communication technologies, or any combination thereof), components for short range wireless communication (e.g., using Bluetooth and/or Bluetooth LE standards, NFC, etc.), and/or other components.

In an example, system 600 can be implemented using interconnected compute sleds of processors, memories, storages, network interfaces, and other components. High speed interconnects can be used such as PCIe, Ethernet, or optical interconnects (or a combination thereof).

Figure 7:
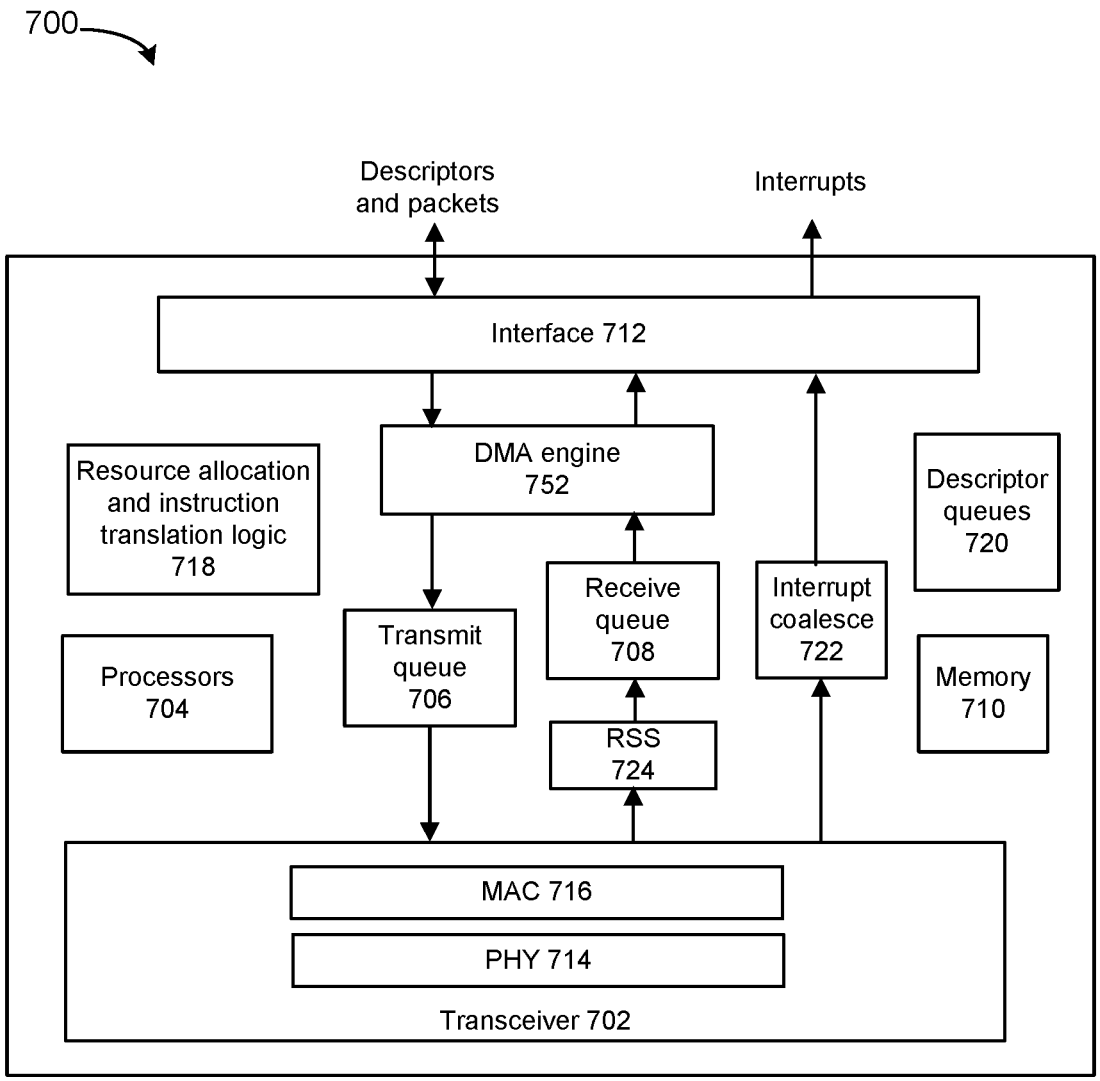
FIG. 7 depicts an example network interface that can use embodiments.

FIG. 7 depicts an example network interface that can use embodiments. Network interface 700 can include transceiver 702, processors 704, transmit queue 706, receive queue 708, memory 710, and bus interface 712, and DMA engine 752. Transceiver 702 can be capable of receiving and transmitting packets in conformance with the applicable protocols such as Ethernet as described in IEEE 802.3, although other protocols may be used. Transceiver 702 can receive and transmit packets from and to a network via a network medium (not depicted). Transceiver 702 can include PHY circuitry 714 and media access control (MAC) circuitry 716. PHY circuitry 714 can include encoding and decoding circuitry (not shown) to encode and decode data packets. MAC circuitry 716 can be configured to assemble data to be transmitted into packets, that include destination and source addresses along with network control information and error detection hash values. Processors 704 can be any processor, core, graphics processing unit (GPU), or other programmable hardware device that allow programming of network interface 700. For example, processors 704 can provide for identification of a resource to use to perform a workload and generation of a bitstream for execution on the selected resource.

Receive side scaling (RSS) 724 can provide distribution of received packets for processing by multiple CPUs or cores. RSS 724 can calculate a hash or make another determination based on contents of a received packet to determine which CPU or core is to process a packet.

Interrupt coalesce 722 can perform interrupt moderation whereby network interface interrupt coalesce 722 waits for multiple packets to arrive, or for a time-out to expire, before generating an interrupt to host system to process received packet(s).

Receive Segment Coalescing (RSC) can be performed by network interface 700 whereby portions of incoming packets are combined into segments of a packet. Network interface 700 provides this coalesced packet to an application.

Direct memory access (DMA) engine 752 can copy a packet header, packet payload, and/or descriptor directly from host memory to the network interface or vice versa, instead of copying the packet to an intermediate buffer at the host and then using another copy operation from the intermediate buffer to the destination buffer.

Memory 710 can be any type of volatile or non-volatile memory device and can store any queue or instructions used to program network interface 700. Transmit queue 706 can include data or references to data for transmission by network interface. Receive queue 708 can include data or references to data that was received by network interface from a network. Descriptor queues 720 can include descriptors that reference data or packets in transmit queue 706 or receive queue 708. Bus interface 712 can provide an interface with host device (not depicted). For example, bus interface 712 can be compatible with PCI, PCI Express, PCI-x, Serial ATA, and/or USB compatible interface (although other interconnection standards may be used).

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, ASICs, PLDs, DSPs, FPGAs, memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation. It is noted that hardware, firmware and/or software elements may be collectively or individually referred to herein as "module" or "logic."

Some examples may be implemented using or as an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner or syntax, for instructing a machine, computing device or system to perform a certain function. The instructions may be implemented using any suitable high-level, low-level, object-oriented, visual, compiled and/or interpreted programming language.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that actually make the logic or processor.

The appearances of the phrase "one example" or "an example" are not necessarily all referring to the same example or embodiment. Any aspect described herein can be combined with any other aspect or similar aspect described herein, regardless of whether the aspects are described with respect to the same figure or element. Division, omission or inclusion of block functions depicted in the accompanying figures does not infer that the hardware components, circuits, software and/or elements for implementing these functions would necessarily be divided, omitted, or included in embodiments.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

The terms "first," "second," and the like, herein do not denote any order, quantity, or importance, but rather are used to distinguish one element from another. The terms "a" and "an" herein do not denote a limitation of quantity, but rather denote the presence of at least one of the referenced items. The term "asserted" used herein with reference to a signal denote a state of the signal, in which the signal is active, and which can be achieved by applying any logic level either logic 0 or logic 1 to the signal. The terms "follow" or "after" can refer to immediately following or following after some other event or events. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

What is claimed is:

1. A system comprising:
   a device interface and
   at least one processor communicatively coupled to the device interface, wherein the at least one processor is to:
   receive a request to perform a workload, wherein the request is to identify an instruction set of a first format to execute;
   select a resource, from among multiple resources, to perform the workload;
   based on a format of instruction set executable by the selected resource being different than the first format, translate the instruction set into a second format, wherein the selected resource is capable to perform an instruction set of the second format; and
   provide the instruction set of the second format for execution by the selected resource.

2. The system of claim 1, wherein the at least one processor is to:
   determine whether a client device is permitted to receive resource type information and
   cause transmission of resource type information to the client device based on the client device being permitted to receive resource type information.

3. The system of claim 1, wherein the at least one processor is to:
   determine whether a client device is permitted to receive resource type information and
   deny sharing resource type information with the client device based on the client device not being permitted to receive resource type information.

4. The system of claim 1, wherein the request to perform a workload includes one or more of: instruction set, type of resource to use, requested service level agreement parameters, identification of language of source code instructions, and requested speed of operation and wherein the at least one processor is to select the resource, from among multiple resources, to perform the workload based on resources that match the type of resource to use.

5. The system of claim 1, wherein the at least one processor is to select a bitstream generator from multiple bitstream generators to use to generate the executable instruction set for the selected resource.

6. The system of claim 1, wherein the at least one processor is to provide the instruction set to the selected resource without translation based on the first format of the instruction set being executable by the selected resource.

7. The system of claim 1, wherein the system comprises a network interface controller.

8. A method comprising:
   receiving a workload request at a network interface, the workload request including an instruction in a first format and a specification of a compute resource type;
   at the network interface, selecting a compute resource from among multiple compute resources based on the specification of compute resource type;
   at the network interface, determining a format of instruction executable by the selected compute resource;
   at the network interface, based on the format of instruction executable by the selected compute resource being different than the first format, translating the instruction into a second format, wherein the selected compute resource is capable to perform an instruction of the second format; and at the network interface, providing an executable instruction based on the instruction in the second format for execution on the selected compute resource.

9. The method of claim 8, wherein the selecting a compute resource from among multiple compute resources based on the specification of compute resource type comprises:
at the network interface, selecting a compute resource from among multiple compute resources of the specified compute resource type based on telemetry data of the multiple compute resources.

10. The method of claim 8, comprising:
receiving a second workload request at the network interface, the second workload request including an instruction in the second format and a specification of a compute resource type;
at the network interface, selecting a compute resource from among multiple compute resources of the specified compute resource type based on telemetry data of the compute resources, wherein the selected compute resource is a second compute resource; and
at the network interface, generating an executable instruction from the instruction in the second format for execution on the second compute resource, wherein the second compute resource is capable to execute the instruction in the second format.

11. The method of claim 8, wherein the workload request includes one or more of: type of resource to use, requested service level agreement parameters, identification of language of source code instructions, and requested speed of operation.

12. The method of claim 8, comprising:
at the network interface, receiving results from the selected compute resource based on execution of the executable instruction.

13. The method of claim 8, comprising:
at the network interface, receiving a request from a client to share compute resource types and programming languages and
at the network interface, sharing the compute resource types and programming languages with the client based on the client being accepted to use compute resources.

14. The method of claim 13, wherein the client comprises one or more of: a client device, an application, a data center, or a compute node.

15. A system comprising:
a first resource platform, the first resource platform comprising at least one device comprising at least one of: a processor, programmable control logic, field programmable gate array (FPGA), a graphics processing unit (GPU), a central processing unit (CPU), a pool of memory devices, a pool of storage devices, or at least one hardware acceleration device;
a second resource platform, the second resource platform comprising at least one device comprising at least one of: a processor, programmable control logic, FPGA, a GPU, a CPU, a pool of memory devices, a pool of storage devices, or at least one hardware acceleration device; and
a network interface communicatively coupled with the first resource platform and the second resource platform, the network interface to:
receive a request to perform a workload using a type of accelerator, the request comprising an instruction of a first format;
select at least one device, from among the first and second resource platforms, to assign to perform the workload;
based on a format of instruction set executable by the selected at least one device being different than the first format, translate the instruction into a second format, wherein the selected at least one device is capable to perform an instruction of the second format; and
transmit the translated instruction in the second format to the selected at least one device for execution by the selected at least one device.

16. The system of claim 15, wherein the request to perform a workload includes one or more of: specific resource to use, type of resource to use, requested service level agreement parameters, identification of language of source code instructions, and requested speed of operation.

17. The system of claim 15, wherein the network interface is to select the at least one device to perform the workload based on a type of accelerator and telemetry data.

18. The system of claim 15, wherein the network interface is to select a bitstream generator to generate a bitstream for execution on the selected at least one device and the network interface is to cause the selected bitstream generator to generate a bitstream for execution on the selected at least one device.

19. The system of claim 18, wherein the network interface is to provide the received instruction to the selected at least one device without translation based on the selected at least one device being capable of executing the received instruction of the first format.

20. A client device comprising:
a network interface and
at least one processor communicatively coupled to the network interface, the at least one processor to:
request performance of a workload, the request to specify a compute resource to use and an instruction set to execute, wherein the instruction set is in a first format and
access a result of the performance of the workload, the result provided using a compute resource different than the specified compute resource and based on execution of an instruction set of a second format that is a translated version of the instruction set of the first format.

21. The client device of claim 20, wherein the at least one processor is to request a type of available compute resources at a remote platform.

22. The system of claim 1, wherein two or more of the multiple resources are to execute instruction sets of different formats.

23. The system of claim 1, wherein the at least one processor is to:
provide, to a client device, an identification multiple resources available for execution of a workload from the client device and receive, from the client device, the request, wherein the request includes an indication of a particular resource to execute a workload.

24. The system of claim 1, wherein the at least one processor is to:
provide, to a second device, at least one result from execution of the instruction set of the second format by the selected resource.

* * * * *